United States Patent Office 2,810,877
Patented Oct. 22, 1957

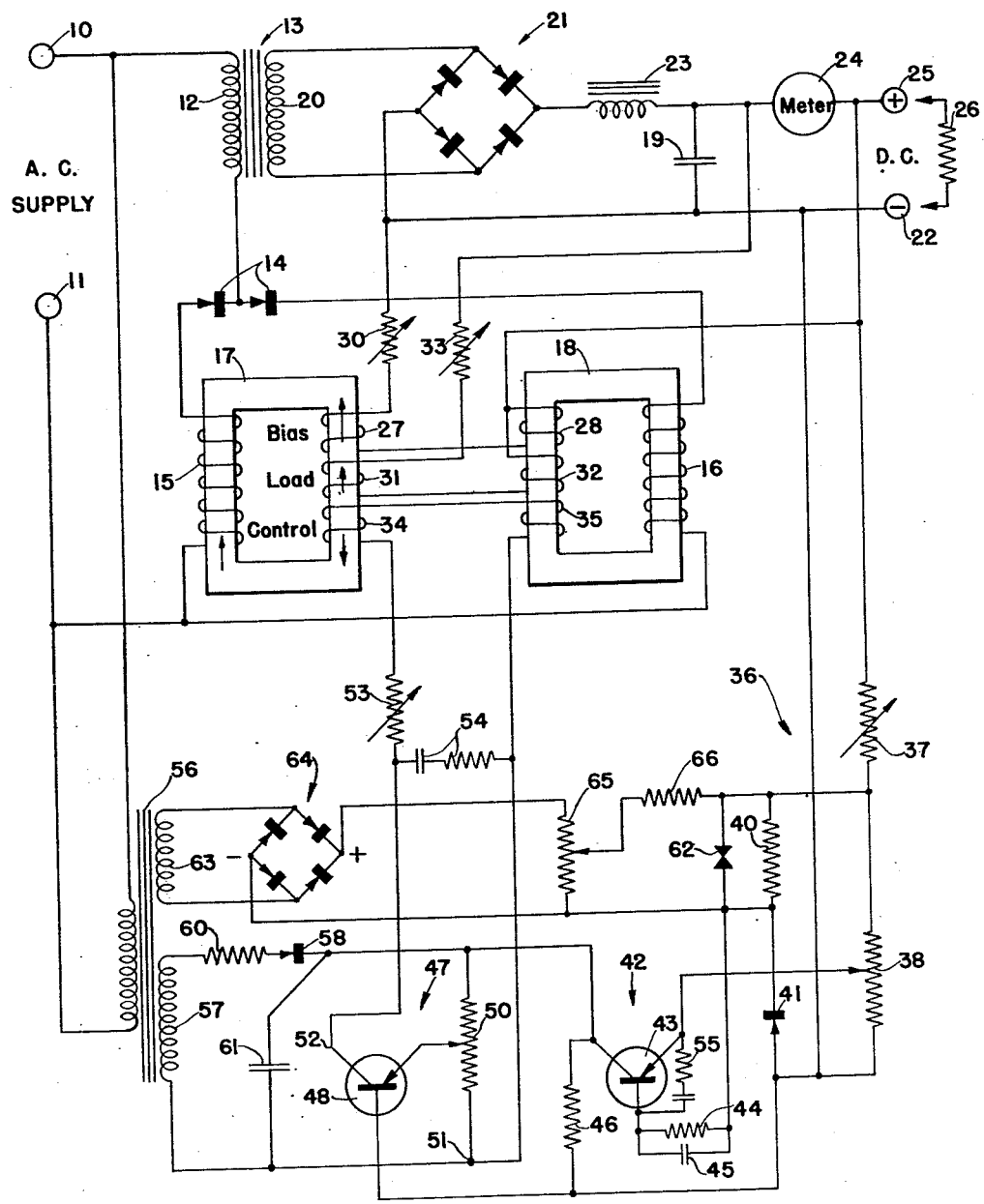

2,810,877

VOLTAGE REGULATOR

Nathaniel Silver, Stamford, Conn., assignor to Sorensen & Company, Inc., Stamford, Conn., a corporation of Connecticut Application April 10, 1956, Serial No. 577,314

5 Claims. (Cl. 321—19)

This invention relates to a voltage regulator which derives its power from an alternating current power supply and delivers direct current power to a load. The invention has particular reference to voltage regulators which are responsive to values of current as well as values of voltage. This invention is an improvement over the voltage regulator described and claimed in United States Patent application, Serial No. 561,497, filed January 26, 1956, by Paul Muchnick and D. W. Tanner.

Prior art voltage regulators employing saturable reactors generally included one or more saturable windings in series with the output circuit. The present invention employs two saturable reactor cores each having a variable reactor winding in series with the primary winding of a power transformer. Rectifying units provide these windings with uni-directional pulses derived from the alternating current supply and thereby produce a self-bias for each of the cores. A four-element rectifier bridge connected directly to the secondary winding of the power transformer produces the direct current for the load and also supplies a small amount of power to the saturable reactors to help bias these units so that they operate on the sensitive portion of the magnetization characteristic.

An additional control for the saturable reactors is derived from a circuit which is proportional to the load current and a third control for the saturable cores is provided which is proportional to the output voltage.

The present invention also includes a circuit by which the variations in input voltage are applied to a resistor in the output voltage sensing circuit, thereby making the regulator more sensitive, increasing its operating range, and narrowing the range of the output voltage.

One of the objects of the present invention is to provide an improved voltage regulator which avoids one or more of the disadvantages and limitations of prior art arrangements.

Another object of the invention is to provide a voltage regulator which is controlled by the voltage across the load, the current through the load, and by the input voltage.

Another object of the invention is to provide a voltage regulator which is devoid of vacuum tubes, glass, and heater filaments.

The feature of the invention, which is an improvement over the circuit disclosed in application, Serial No. 561,-497, referred to above, resides in a circuit which applies the variations in input voltage to a resistor in the sensing circuit which is also controlled by the output voltage.

For a better understanding of the present invention together with other and further objects thereof, reference is made to the following description taken in connection with the accompanying drawing.

The drawing is a schematic diagram of connections of the voltage regulator.

Referring now to the drawing, the voltage regulator includes a pair of input terminals 10, 11, which are to be connected to an alternating current power supply system which may vary considerably in applied voltage. The supply terminals are connected in series with a primary winding 12 of a power transformer 13, rectifying units 14, and two windings 15 and 16 in parallel on saturable cores 17 and 18. A secondary winding 20 on transformer 13 is connected directly to opposite junction points of a four-element bridge rectifier 21, the other two terminals of which are connected to a negative terminal 22 of the output circuit and a series reactor 23. An ammeter 24 is connected between reactor 23 and the positive terminal 25 of a load circuit. Terminals 22 and 25 are for connection to a direct current load 26 which may vary considerably in resistance value. Reactor 23 in combination with capacitor 19 removes the alternating current ripple from the direct current output voltage. Rectifiers 14 are shown connected between transformer winding 12 and the windings 15 and 16. It is obvious that they may be placed in the circuit between the windings 15, 16, and the input terminal 11.

In order to bias cores 17 and 18 with sufficient magnetic flux to maintain operation at a sensitive part of the characteristic curve, a bias winding on each of said cores is employed. One set of these windings 27 and 28 is connected in series across the direct current line in series with an adjustable resistor 30. Another set of windings 31 and 32 is connected in series with an adjustable resistor 33 and is bridged across the ammeter 24, thereby supplying a magneto-motive force which is proportional to the current passing through the ammeter 24 and the load 26. The flux produced by windings 15, 16, and the flux produced by control windings 34, 35 and 31, 32 are aiding while the flux due to windings 27 and 28 are bucking as indicated by the arrows in the figure.

A sensing circuit 36 for the determination of an error voltage, above or below a desired output voltage, is connected directly across the output terminals 25, 22, and includes a variable resistor 37, a voltage divider 38, an input resistor 40, and a semi-conductor diode 41. It should be pointed out that the diode 41 is connected in the circuit so that current flows through it in a direction which is the reverse of the usual current flow. That is, the diode cathode receives current from the positive terminal 25, through resistors 37 and 40, and the diode anode is connected directly to the negative terminal 22. In this mode of operation the voltage across the diode is maintained substantially constant since the point of operation is on the steepest part of the characteristic curve, just beyond the Zener voltage. This mode of operation transfers almost all of the voltage variation across the load to resistor 40.

The voltage across resistor 40 is applied to the input circuit of a transistor amplifier stage 42 which includes a transistor 43 of the PNP type. One side of the input circuit is connected to the transistor emitter in series with a portion of resistor 38. The other side of the input resistor 40 is connected to the transistor base in series with a resistor 44 connected in shunt with a capacitor 45. The output circuit of this amplifier stage is connected to a load resistor 46 which is connected between the transistor collector and the negative terminal 22.

The second transistor stage 47 includes a PNP transistor 48 having its emitter and base connected across load resistor 46 in series with a portion of an input resistor 50. The output circuit of this stage is the load circuit connected to junction points 51 and 52. The load circuit includes an adjustable resistor 53 and control windings 34 and 35 on saturable cores 15 and 16. An anti-hunt circuit 54 is connected across the load lines to reduce hunting and other undesirable current surges. A similar circuit 55 is connected across the base-emitter circuit of the first transistor stage for the same reason.

The direct current power supply for operating the first transistor stage 36 is derived from the output circuit while the power for the second stage 47 is derived from the A. C. supply terminals 10, 11, by means of a step-down transformer 56 having a secondary winding 57 connected in series with a rectifier unit 58 and a resistor 60. This direct current supply is shunted by a capacitor 61 which absorbs the alternating current components. The amplifying circuit also includes a compensating varistor 62, the resistance of which varies in an inverse manner with temperature as compared to resistor 40. These two circuit components are connected in parallel and provide a constant resistance across their terminals regardless of the ambient temperature.

In order to make the sensing circuit more responsive to the variations of the input voltage, a secondary winding 63 is placed on the core of transformer 56 and its output is rectified by a bridge 64. The direct current from this bridge is applied to an adjustable voltage divider 65 and the output from this circuit is connected to the input resistor 40 in series with a resistor 66. Variations of input voltage are thereby added to the voltage variations of the output load circuit, the voltage across resistor 40 is being a combination of both input and output voltages.

The operation of this circuit is as follows: With an average alternating voltage applied at terminals 10 and 11, current flows through primary winding 12 and reactor windings 15 and 16. The reactor windings carry unidirectional pulses (resulting in self bias) but the primary winding 12 is supplied with alternating current. Secondary winding 20 in combination with rectifier bridge 21 produces a direct current voltage at terminals 22, 25, which is used by load 26. The load voltage is applied through a sensing circuit 36 to a transistor amplifier and the output of this circuit is applied to control windings 34 and 35 to maintain the reactance of windings 15 and 16 at an average value.

Now let it be assumed that the voltage across terminals 22 and 25 is increased. This may occur when the load resistance is increased or when the A. C. supply voltage is increased. If the load resistance is increased, the voltage across the sensing circuit 36 is increased and a larger current flows through diode 41 causing the voltage across resistor 40 to rise. This increase in voltage is amplified by both transistor stages without change of phase or polarity reversal and an increase of current is applied to windings 34 and 35 causing a decrease in the total flux through cores 17 and 18, lowering the degree of saturation and increasing the reactance of coils 15 and 16, thereby reducing the current through primary winding 12 and lowering the voltage at output terminals 22, 25, to the desired value. A similar operation occurs, but with reversed voltages and currents when the output voltage is reduced.

If the increase in output voltage is due to an increase in the applied voltage at terminals 10 and 11, the same action occurs except, in addition, the increase is transmitted by secondary winding 63, bridge 64, voltage divider 65, and resistor 66 to input resistor 40. In this manner an increase in input voltage operates in two ways to stabilize the output voltage, one from a sensing circuit coupled to the output terminals, and the second from the input A. C. supply.

The load compensating windings 31 and 32 are connected across the meter 24 and carry a current proportional to the meter's resistance. Connection can be made to any series resistor in the load circuit. The result of this compensating circuit is the production of a greater range of operating values on the voltage regulator and a more accurate load voltage. However, this circuit may be eliminated if desired, and the circuit operated with only the bias and control windings employed for voltage regulation.

The above circuit permits a wide range of adjustments for the compensation action. By adjusting voltage divider 65 to supply a larger voltage from the input circuit, the device may be over-compensated, causing the output voltage to rise when the input A. C. supply is decreased.

While there has been described and illustrated a specific example of the voltage regulator, it will be obvious that various changes and modifications may be made therein without departing from the field of the invention which should be limited only by the scope of the appended claims.

I claim:

1. A voltage regulator comprising; a pair of input terminals for connection to a source of alternating current power which may vary in applied voltage; a pair of output terminals for supplying a load with direct current power, the voltage of which varies within a restricted range of values; two saturable reactors each of which includes a saturable core, a reactive winding, and a control winding; the first of said reactive windings connected in series with a first rectifier for passing positive alternations of an alternating current; the second of said reactive windings connected in series with a second rectifier for passing negative alternations of the alternating current; an input circuit which includes the input terminals, the primary winding of a power transformer, and the parallel combination of said reactor windings and the rectifiers; a control circuit which includes the control winding on each of said cores connected to the output circuit of an amplifier, the input circuit of said amplifier coupled to said output terminals whereby the current in said control circuit is responsive to the voltage variations across the output terminals; an output circuit which includes a secondary winding of said power transformer, a rectifier, and said output terminals; and a compensation circuit which includes a coupling between said input terminals and the input circuit of said amplifier, said coupling including a rectifier and a series resistor.

2. A voltage regulator in accordance with claim 1 wherein each of said saturable cores contains an adjustable bias winding connected to the output circuit.

3. A voltage regulator in accordance with claim 1 wherein each of said saturable cores contains a load winding connected to a portion of the output circuit whereby the current in said load windings is proportional to the current in the load.

4. A voltage regulator in accordance with claim 1 wherein said amplifier comprises at least one transistor amplifier stage.

5. A voltage regulator in accordance with claim 1 wherein said compensation circuit includes a transformer having its primary winding connected to the input terminals and its secondary winding connected to a rectifier circuit, the rectifier connected to a coupling circuit between the rectifier and the input circuit of said amplifier, thereby transmitting voltage variations from the input terminals to the input circuit of the amplifier.

References Cited in the file of this patent

UNITED STATES PATENTS

| | | |
|---|---|---|
| 2,306,998 | Claesson | Dec. 29, 1942 |
| 2,470,556 | Hedstrom et al. | May 17, 1949 |
| 2,596,685 | Hedstrom | May 13, 1952 |
| 2,721,304 | Silver et al. | Oct. 18, 1955 |
| 2,723,372 | Eagan et al. | Nov. 8, 1955 |